United States Patent [19]
Kosecoff

[11] 3,765,581
[45] Oct. 16, 1973

[54] BIKE CARRIER

[76] Inventor: Irving William Kosecoff, 3201 Butler Ave., Los Angeles, Calif. 90066

[22] Filed: July 10, 1972

[21] Appl. No.: 270,320

[52] U.S. Cl. .................................... 224/42.03 B
[51] Int. Cl. ............................................ B60m 9/10
[58] Field of Search ............. 224/42.03 B, 42.03 R, 224/42.03 A, 29 R; 211/17, 22

[56] References Cited
UNITED STATES PATENTS

| | | | |
|---|---|---|---|
| 3,437,248 | 4/1969 | Allen | 224/42.03 R |
| 3,710,999 | 2/1973 | Allen | 224/42.03 B |
| 3,670,935 | 6/1972 | Hinkston | 224/42.03 B |
| 559,312 | 4/1896 | Seely | 211/22 |

*Primary Examiner*—Gerald M. Forlenza
*Assistant Examiner*—Jerold M. Forsberg
*Attorney*—Pastoriza & Kelly

[57] ABSTRACT

A bike carrier has a generally U-shaped frame constituted by a pair of downwardly diverging struts whose upper ends are coupled to a relatively low-slung cross brace. Projecting rearwardly from the cross brace is a pair of hangers configured with sets of plural retaining bends which are angled inwardly towards one another to accept and support the V-frame of a bike.

Adjustable clamping assemblies are coupled to the lower portions of both struts to secure the U-shaped frame to vehicle bumpers of various sizes and shapes.

11 Claims, 2 Drawing Figures

PATENTED OCT 16 1973

3,765,581

BIKE CARRIER

BACKGROUND OF THE INVENTION

This invention generally relates to article-carrying devices and more particularly to bike carriers capable of being removably installed on vehicle bumpers.

A number of stationary and collapsible bike carriers exist that can be demountably installed on the rear bumpers of automobiles. The outwardly projecting arms or hangers are ordinarily spaced apart and structured so that the bike is supported between its front upper portion and middle upper portion.

This situation has the adverse effect of causing the bike and/or the bike carrier itself to obstruct rearward vision. In addition the particular space occupied by the bike and bike carrier tends to hinder access to the vehicle trunk space.

Conventional clamping assemblies are cumbersome and time-consuming to assemble and are not versatile with respect to varying sizes and curvatures of the vehicle bumpers. Many conventional bike carriers gradually become unstable and unsafe to use because of faulty clamping assemblies and loose framework connections.

SUMMARY OF THE INVENTION

Briefly stated this invention comprehends a relatively inexpensive, simple and durable bike carrier capable of being removably installed on vehicle bumpers of varying sizes and shapes.

In its broader aspects, this invention encompasses a bike carrier that includes a pair of spaced and generally upright struts with upper ends and lower ends, the struts being formed with height adjustment retaining holes. A cross brace spans the space between these struts with its opposite ends coupled to corresponding strut upper ends. The struts and cross brace are generally aligned in coplanar relationship and constitute a U-shaped framework.

A pair of laterally spaced bike hangers are coupled to and extend rearwardly from the cross brace. The hangers are configured with sets of plural retaining bends and are tilted so that the concave sides of the sets of plural retaining bends face at least slightly inwardly towards one another.

Clamping assemblies are adjustably secured to corresponding struts for removably securing the U-shaped framework to a vehicle bumper. Each clamping assembly has an upper bumper clamp and a lower bumper clamp. Stabilizing bolts are coupled to the struts and are positioned between the upper and lower clamps of both clamping assemblies so that they contact and exert pressure against the associated vehicle bumper.

By this construction a conventional bike may be easily arranged on the hangers by way of its V-frame supported between a pair of mating retaining bends.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figure 1:
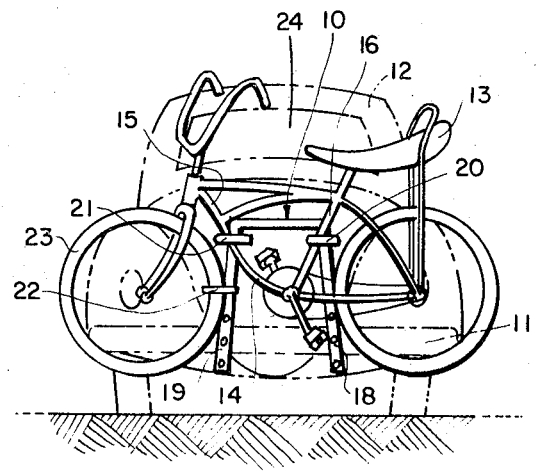
FIG. 1 is a perspective view showing a bike carrier constructed in accordance with this invention mounted on the rear bumper of a vehicle; and, FIG. 2 is a perspective, partially sectional and partially exploded view showing important details of the bike carrier.

Referring now primarily to FIG. 1, the bike carrier 10 constructed in accordance with this invention is structured for demountable attachment to a bumper 11 of any conventional automobile 12. A conventional bike 13 has a typical V-frame 14 constituted by a diagonal bar 15 extending from the front steering section to the pedal assembly and a slightly inclined vertical support 16 extending from the seat to the pedal assembly. All bicycles constructed for girls and boys have a V-frame of this general configuration, some being relatively more divergent or wide open than others.

The three basic structural members of the bike carrier 10 which constitute a generally U-shaped frame are a cross brace 17 and a pair of spaced and generally upright struts 18 and 19. The cross brace 17 spans across the lateral space between the struts 18 and 19. A pair of laterally spaced bike hangers 20 and 21 extend rearwardly from the cross brace 17 and function, in a manner to be more fully described, to cradle and support the V-frame 14 of bike 13. When the bike 13 is set in place for transit then one or more straps or belts 22 may be employed to lash or secure parts of the bike 13 such as front wheel 23 to the bike carrier 10. With the bike 10 held in its relatively low-slung or low profile position, the driver's rearward view through the rear window 24 is generally unobstructed.

Figure 2:
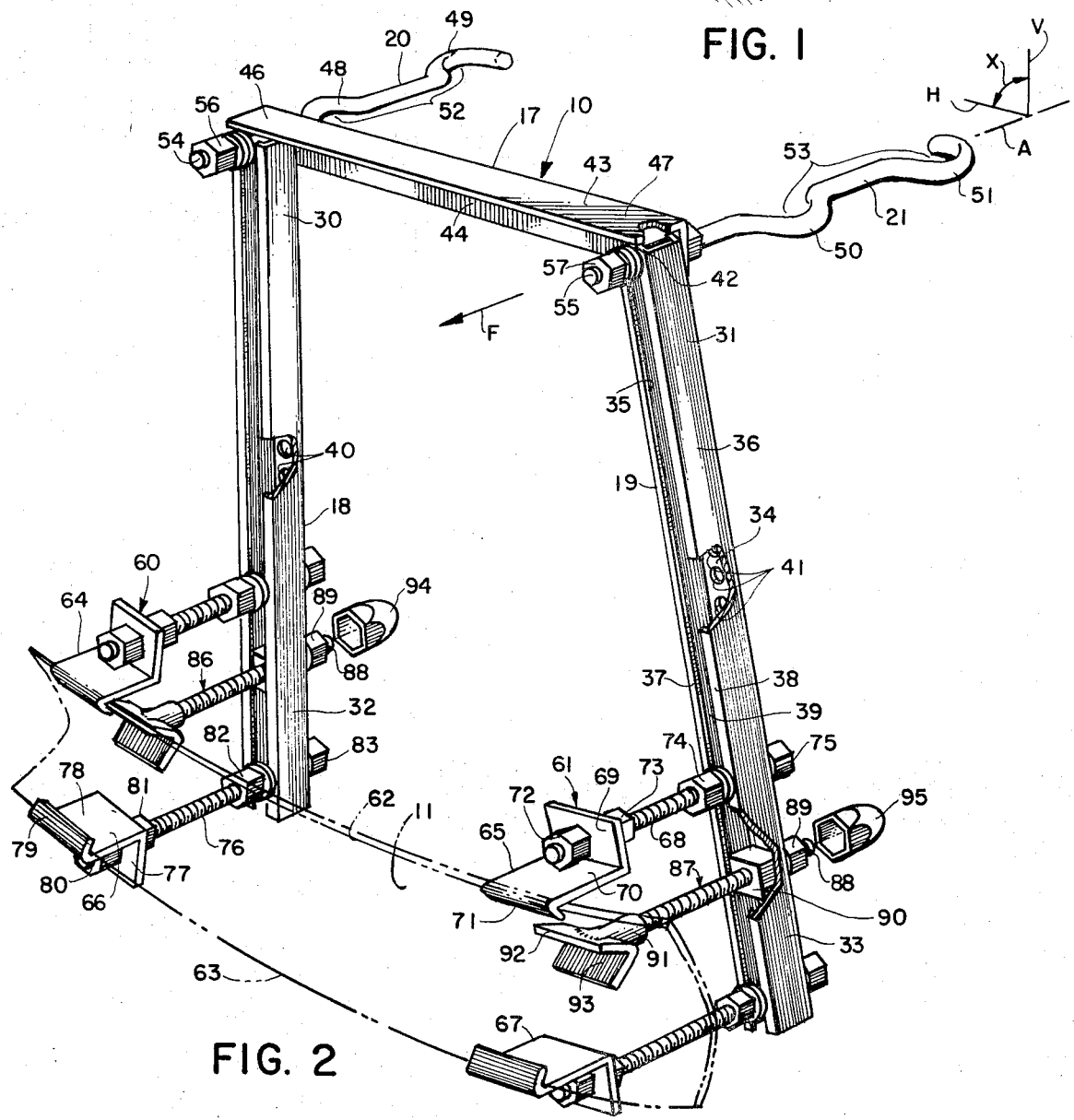

Referring now primarily to FIG. 2, the arrow F indicates the front portion of the bike carrier 10 and the forward direction in which the vehicle would travel, with the bike carrier 10 removably coupled to the rear bumper 11. The struts 18 and 19 have upper ends 30 and 31 respectively and lower ends 32 and 33 respectively. As shown, the struts are essentially channel bars which diverge in a downward direction towards the rear bumper 11. Their construction is essentially identical and therefore a full description of one will suffice for a full understanding of both. Each strut has a rear wall 34, an inner side wall 35, an outer side wall 36 and a front wall constituted by a pair of mutually in-turned shoulders 37 and 38 which define a longitudinally extending slot 39. The rear walls of struts 18 and 19 are formed with a series of height-adjustment retaining holes 40 and 41 respectively.

The outer portions 42 of the strut upper ends 30 and 31 are sloped or chamfered. The cross brace 17 is essentially an angle bar having a top plate 43 and a depending plate 44 through which the hangers 20 and 21 project. The opposite ends of cross brace 17 cover and lie adjacent to the strut upper ends 30 and 31. When the strut lower ends 32 and 33 are spread apart by some predetermined distance then the strut upper ends 30 and 31 will automatically engage the cross brace top plate 43 to thereby stop further divergence of the struts and limit their outward travel.

The hangers 20 and 21 are generally parallel and are formed with sets of plural retaining bends which, for example, may include two through five in number. For purposes of simplification hanger 20 has an inner retaining bend 48 and an outer retaining bend 49 that assumes the configuration of a hook. In a similar manner hanger 21 has an inner retaining bend 50 and an outermost retaining bend 51 shaped like a hook. The mating retaining bends 48 and 49 could cooperate to hold the V-frame of one bike while the tandemly aligned mating bends 49 and 51 could co-act to hold the V-frame of another bike. The rearwardly extending parts of hangers 20 and 21 are preferably covered with a coating of scratch resistant material such as plastisol.

For purposes of describing the important orientation of the hangers, the letter A represents the axis of hanger 21, the letter V represents a verticle line and the letter H represents a horizontal line intersecting the axis A. Both hangers 20 and 21 are twisted or tilted mutually inwardly by the same angular degree, i.e., angle X, so that the concave inner faces 52 and 53 of their respective retaining bends face one another. In order to hold the V-frame of a bike the angle X may range from some slight angle to approximately ninety degrees. For many situations the angle X would be 90° so that the retaining bends would lie within a common plane.

The forwardly extending segments 54 and 55 of the hangers 20 and 21 are threaded to receive conventional nut and washer assemblies 56 and 57 which aid in coupling the struts and cross brace together. The nut and washer assemblies 56 and 57 are sized to rest upon the abutment or shoulders 37 and 38 of the struts 18 and 19.

A pair of clamping assemblies 60 and 61 of identical construction are adjustably secured to the strut lower ends 32 and 33 respectively. The clamping assemblies operate to removably secure the U-shaped framework portion of the bike carrier 10 to the upper edge 62 and the lower edge 63 of the bumper 11. The clamping assemblies 60 and 61 have upper bumper clamps 64 and 65 respectively and lower bumper clamps 66 and 67 respectively.

The upper bumper clamp of each clamping assembly has a threaded rod 68 secured to a generally vertical mounting plate 69. A forwardly extending spacer plate 70 extends beneath the axis of threaded rod 68 and terminates in a downwardly turned holding lip 71 that may be hooked over the bumper edge 62. Because the holding lip 71 is totally beneath the threaded rod 68 there cannot be any clearance or interference problem caused by an extra long rod 68 contacting the bumper 11. A pair of locking nuts 72 and 73 can be adjusted and tightened to maintain the mounting plate 69 in a desired position. Nut and washer connectors 74 and 75 are tightened against the front wall shoulders 37 and 38 and the rear wall 34 respectively. Stress and strain on the bike carrier 10 is considerably reduced and therefore the risk of shearing and rupture is correspondingly minimized because the force is absorbed or spread over a wider area as opposed to a U-shaped member lacking in-turned shoulders or abutments.

The construction of the lower bumper clamps 66 and 67 is essentially the same as that of the upper bumper clamps 64 and 65. Each lower bumper clamp has a threaded rod 76 secured to a mounting plate 77. Extending forwardly from the upper edge of mounting plate 77 is a spacer plate 78 whose forwardmost portion terminates in an upwardly turned holding lip 79 that is secured to and hooked over the bumper lower edge 63. Locking nuts 80 and 81 can be adjusted to maintain the lip 79 in place. Nut and washer connectors 82 and 83 secure the threaded rod 76 to strut 18. The threaded rod may be inserted through selected height-adjustment retaining holes in order to precisely accommodate the particular dimensions and configurations of varying vehicle bumpers.

Between the upper and lower bumper clamps of the clamping assemblies 60 and 61 are a pair of stabilizing bolts 86 and 87 respectively. The stabilizing bolts 86 and 87 are identically constructed and each has an outwardly projecting bolt segment 88 disposed through a selected height-adjustment retaining hole and held in place by an external locking nut 89 and an internal locking nut 90. The internal locking nut 90 is purposely sized to be confined within the strut and locked against rotation by the strut side walls 35 and 36. The sets of upper and lower bumper clamps and stabilizing bolts constitute a pair of three-point contacts with the bumper to assure tight and dependable attachment. The exposed bolt segments 88 or both the bolt segments 88 and their associated external locking nuts 89 may be covered, for safety and aesthetic purposes, by protective caps 94 and 95 constructed from pliable scratch-resistent material. The forward ends 91 of the stabilizing bolts which are constructed from a pair of diverging pressure plates 92 and 93 may likewise be covered with pliable scratch-resistant material.

The internal locking nut 90 and external locking nut 89 can be adjusted to orient the pressure plates 92 and 93 so that they contact an intermediate portion of the bumper 11 with their junction of intersection being generally perpendicular to the cross brace 17. For strength and durability the cross brace 17 and the struts 18 and 19 are constructed from high-strength aluminum that has been anodized.

The internal locking nut 90 acts as pressure plates to accept and distribute reaction or counter-forces transmitted through the stabilizing bolts 86 and 87 to the struts 18 and 19. Because the nuts or pressure plates 90 have considerable pressure-distributing area then the corresponding stress and strain exerted on the struts is considerably minimized. The pressure plates 90 are shown as conventional nuts for purposes of illustration and could be any other suitable type of conventional pressure transmitting element.

OPERATION

The upper bumper clamps 64 and 65, lower bumper clamps 66 and 67 and stabilizing bolts 86 and 87 can be relatively extended or retracted and inserted through selected height-adjustment retaining holes in order to fit vehicle bumpers of various heights, depths, and curvatures. Before or after the bike carrier 10 has been installed on bumper 11 the hangers 20 and 21 may be properly positioned to accomodate the V-frames of two or more bikes. Relatively short straps may be used to lash the bike portions to the bike carrier 10 and relatively long straps or cords with clips may be used to secure the cross brace 17 to a portion of the vehicle such as the trunk lid.

The chamfered outer portions 42 of the strut upper ends 30 and 31 permit the struts 18 and 19 to be spread outwardly to any desired positions within a given range, not exceeding the outer limits where motion would become stopped. In this manner the bike carrier can be easily and conveniently adjusted and varied to conform to bumper configurations of different sizes and configurations.

While the bike rack 10 has been shown and described in connection with an automobile rear bumper, it is to be understood that the bike carrier may also be detachably coupled to an automobile front bumper, a special frame on a trunk deck or roof or any other section of an automobile.

From the foregoing it will be evident that the present invention has provided a bike carrier in which all of the various advantages are fully realized.

What is claimed is:

1. A bike carrier attachable to a vehicle bumper, comprising:
   a. a pair of spaced and generally upright struts with upper ends and lower ends, the struts being formed with height-adjustment retaining holes;
   b. a cross brace spanning the space between the struts with its opposite ends coupled to corresponding strut upper ends, the struts and cross brace being in coplanar relationship constituting a U-shaped framework;
   c. a pair of laterally spaced bike hangers coupled to and extending rearwardly from the cross brace, the hangers being configured with sets of plural retaining bends and tilted so that the concave sides of the sets of plural retaining bends face at least slightly inwardly toward one another;
   d. clamping assemblies adjustably secured to corresponding struts for removably securing the U-shaped framework to a vehicle bumper, each clamping assembly having an upper bumper clamp and a lower bumper clamp; and,
   e. stabilizing bolts coupled to the struts and positioned between the upper and lower bumper clamps of the clamping assemblies for contacting and exerting pressure against a vehicle bumper,
   wherein, a bike may be arranged on the hangers with its V-frame supported in a mating pair of retaining bends.

2. The structure according to claim 1, where each upper bumper clamp includes:
   a threaded rod secured to a corresponding strut and extending through a height-adjustment retaining hole, a mounting plate connected to the rod, a forwardly extending spacer plate disposed beneath the rod axis and secured to the mounting plate, and, a downwardly turned holding lip secured to the forward edge of the spacer plate for hooking on the vehicle upper bumper edge,
   wherein, the holding lip can be hooked on the bumper edge without clearance problems and causing interference between the rod and the bumper.

3. The structure according to claim 1 where each lower bumper clamp includes:
   a threaded rod secured to a corresponding strut and extending through a height-adjustment retaining hole, a mounting plate connected to the rod, a forwardly extending spacer plate disposed above the rod axis and secured to the mounting plate, and, an upwardly turned holding lip secured to the forward edge of the spacer plate for hooking on the vehicle lower bumper edge,
   wherein, the holding lip can be hooked on the lower bumper edge without clearance problems or causing interference between the rod and the bumper.

4. The structure according to claim 1, wherein:
   each strut is a channel bar having a rear wall in which height-adjustment holes are formed, side walls, and, a front wall constituted by a pair of mutually in-turned shoulders that define a longitudinally extending slot.

5. The structure according to claim 4, wherein:
   the cross brace is an angle bar having a top plate that generally covers and lies adjacent to the strut upper ends.

6. The strut according to claim 5, wherein:
   the outer portions of the strut upper ends are chamfered so that when the strut lower ends are spread apart by a predetermined distance the strut upper ends will engage the cross brace top plate to thereby stop further divergence of the struts.

7. The structure according to claim 4, where:
   each stabilizing bolt is disposed through a selected height-adjustment retaining hole and held in place by;
   an externally located nut attached to a rearwardly and outwardly projecting bolt segment; and,
   an internally located pressure plate confined within the strut and generally locked against rotation by the strut side walls so that the stabilizing bolt can remain precisely in a desired position, and distribute pressure to the strut.

8. The structure according to claim 7, wherein;
   the forward end of each stabilizing bolt is formed with a pair of diverging pressure plates whose contact edges are covered with pliable scratch-resistant material, the pressure plates being arranged so their junction of intersection is generally perpendicular to the cross brace.

9. The structure according to claim 7, wherein:
   the rearwardly and outwardly projecting bolt segment is covered by a slip-on cap constructed of pliable scratch-resistant material.

10. The structure according to claim 4, wherein:
    the upper and lower bumper clamps are mounted to their corresponding struts with the assistance of connectors engaged with and seated upon the in-turned shoulders of the strut front walls.

11. The structure according to claim 1, wherein:
    the sets of retaining bends associated with the pair of hangers are tilted inwardly to lie substantially in a horizontal plane;
    the forward segments of the hangers aid in coupling the strut upper ends to the cross brace opposite ends; and,
    the struts and cross brace are constructed from anodized aluminum.

* * * * *